Oct. 18, 1955   C. F. MORAIN   2,721,060
COLLAPSIBLE ROADBLOCK STRUCTURE
Filed June 19, 1951   2 Sheets-Sheet 1
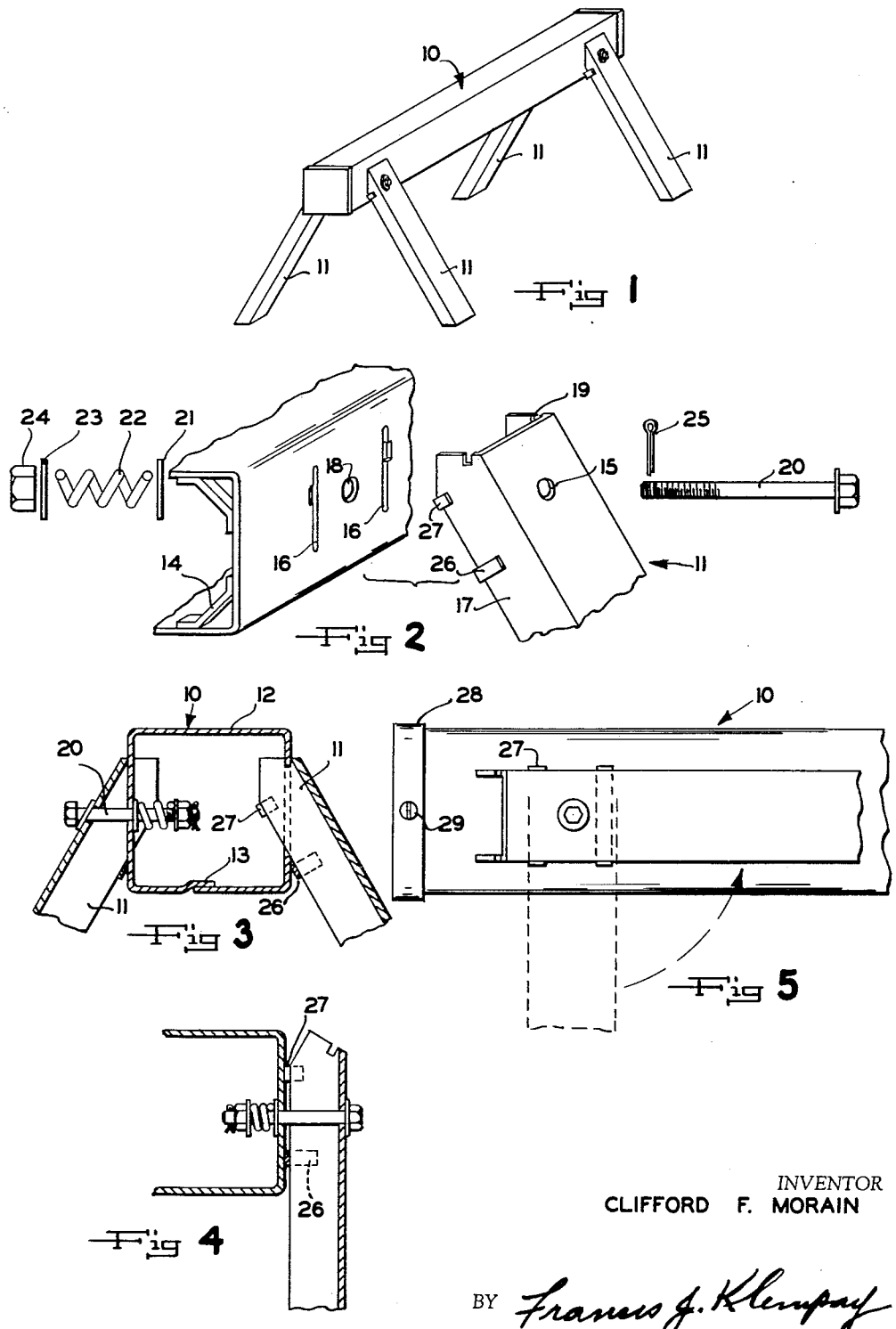
INVENTOR
CLIFFORD F. MORAIN
BY *Francis J. Klempay*
ATTORNEY Oct. 18, 1955     C. F. MORAIN     2,721,060
COLLAPSIBLE ROADBLOCK STRUCTURE
Filed June 19, 1951     2 Sheets-Sheet 2
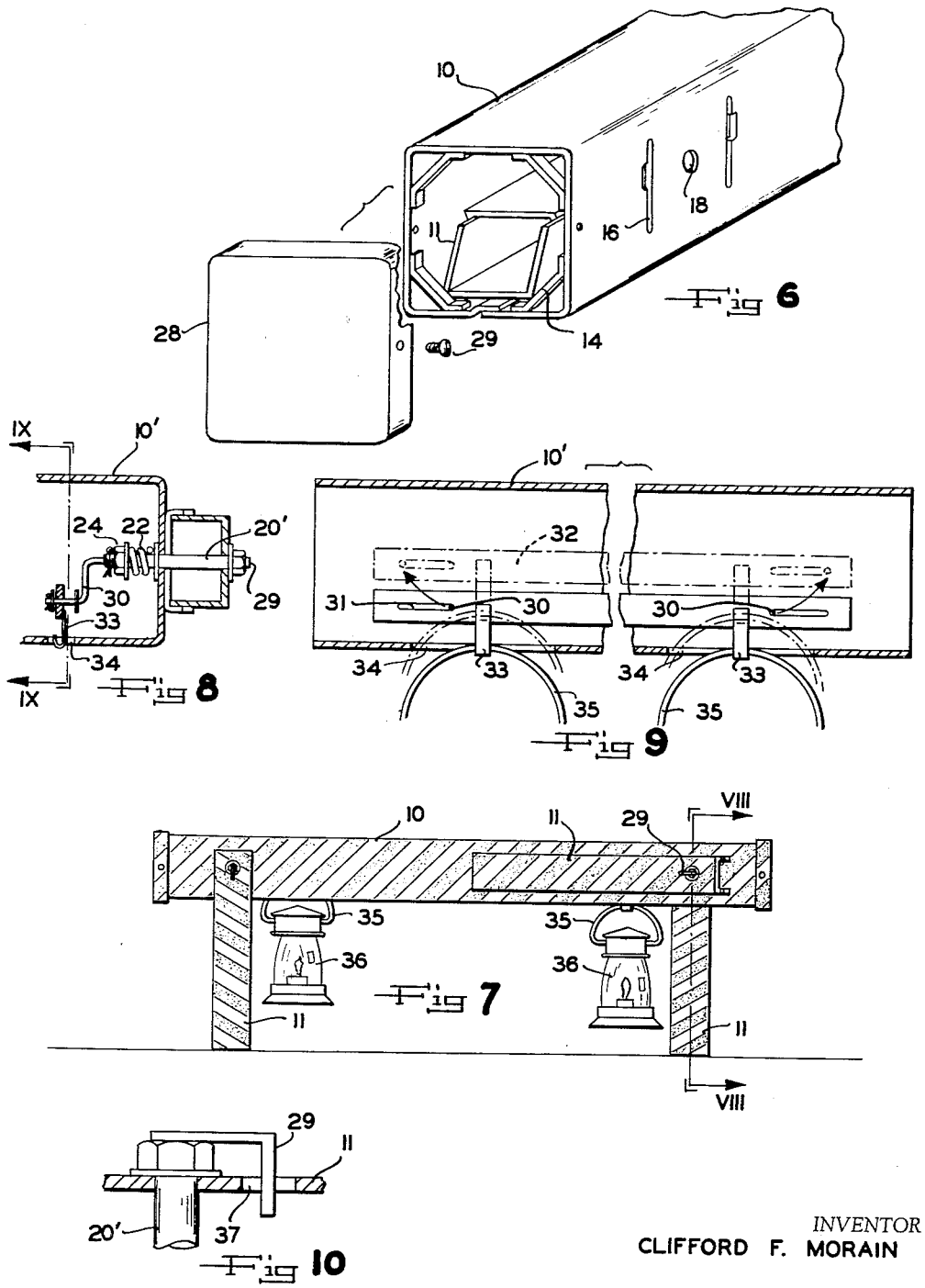
INVENTOR
CLIFFORD F. MORAIN
BY Francis J. Klempay
ATTORNEY

United States Patent Office 2,721,060
Patented Oct. 18, 1955

2,721,060
COLLAPSIBLE ROADBLOCK STRUCTURE

Clifford F. Morain, Youngstown, Ohio

Application June 19, 1951, Serial No. 232,277

5 Claims. (Cl. 256—64)

This invention relates to apparatus for blocking off roadway areas from pedestrian or vehicular traffic, and more particularly to such a device which is collapsible and may be quickly and easily folded for storage and/or transportation.

It is an object of the present invention to provide a device of the character described which is of light-weight construction to improve the portability of the apparatus, but which is of adequate strength to withstand the hard usage to which such apparatus is normally subjected.

It is another object of this invention to provide a device of this character which may be quickly collapsed into a small and compact unit for transportation or storage but which when unfolded forms a rigid structure, the folding components of which are securely locked in position to prevent accidental collapse.

Another object of the invention is the provision of a collapsible road blocking structure which may be folded without disassembling the components thereof. This eliminates an objectionable feature characteristic of prior road-blocking apparatus. In such prior apparatus wherein several loose parts were assembled to form the final structure it was not uncommon to transport the various parts to the area of construction only to there discover an overage of certain parts and a shortage of others; it being understood that in general construction work, where such apparatus is ordinarily employed, the same is frequently transported from place to place and is often stored in haphazard manner when not in use, thus rendering it difficult to keep accurate account of the components without resorting to a physical counting of the same which is time consuming and accordingly undesirable.

A further object of the invention is the provision of apparatus having the characteristics enumerated above which may, if desired, be totally disassembled and which, when so disassembled, may be stored as a self-contained unit occupying a minimum of space. As will become fully apparent upon consideration of the specification the apparatus proposed by my invention may be totally disassembled and packed into a self-contained unit which may be stored or transported with maximum ease and utilization of space. It will further be apparent that such storage or transportation may be accomplished without danger of losing or misplacing any of the component parts.

Yet another object of the invention is the provision in apparatus as described above of certain additional novel features whereby warning lanterns or the like may be suspended from the apparatus in such manner as to substantially negative the possibility of theft thereof.

Yet another object of the invention is the provision of a road-blocking device having various or all of the characteristics enumerated above which is easily and economically fabricated from standard materials and components and which will be generally pleasing in outward appearance.

Other objects and advantages of the invention will become apparent upon full consideration of the following detailed specification and accompanying drawing wherein are shown certain preferred embodiments of my invention.

In the drawing:

Figure 1 is a perspective view of apparatus constructed according to the principles of my invention;

Figure 2 is a fragmentary exploded enlarged view of the apparatus of Figure 1 showing details of a folding leg assembly as provided by the present invention;

Figures 3, 4 and 5 are fragmentary enlarged views of the apparatus of Figure 1 showing, in the order stated: a leg locked in supporting position, a leg unlocked preparatory for folding, and a leg in folded position;

Figure 6 is a fragmentary exploded enlarged view of the apparatus of Figure 1 showing a method of packing the same into a self-contained unit when totally disassembled;

Figure 7 is a front elevation of a second embodiment of my invention incorporating novel means for securing warning lanterns or other articles of display to the road blocking apparatus;

Figure 8 is a fragmentary sectional enlarged view taken along line VIII—VIII of Figure 7;

Figure 9 is a fragmentary sectional enlarged view taken along line IX—IX of Figure 8; and Figure 10 is an enlarged fragmentary view of the apparatus shown in Figure 8, showing detailed features thereof.

Referring now to the drawings, the principal embodiment of the invention, shown in Figures 1–6, comprises a cross bar member 10 supported at each end by a pair of downwardly and outwardly extending legs 11. The cross bar 10 is preferably constructed of a length of light gage sheet metal 12 formed into a tubular member having a rectangular cross section as shown in Figure 3; the edges of the metal 12 being lapped and secured by any suitable means as, for example, spot welding. Additional strength is provided by a plurality of corner braces 14 secured to the walls of the cross bar 10 at each end thereof in the manner shown. Near each end of the cross bar 10, on the vertical side walls thereof, I have provided pairs of spaced vertical slots 16 and holes 18 located centrally with respect to each of the said pairs of slots; the arrangement being shown in Figure 2.

Each of the legs 11 comprises a length of light gage sheet metal formed into a channel member. The parallel side walls 17 of the legs 11 are spaced to correspond with the spacing of the slots 16 and are adapted to be partially inserted therein as shown in Figure 3. Located at the upper end of each leg 11, in each side wall 17 thereof, I have provided a notch 19 which is of sufficient width to receive the metal material of the cross bar 10 to thus positively position the upper end of the leg 11 with respect to the cross bar 10 when the said parts are assembled. As shown, the notches 19 are directed angularly away from the principal axis of the leg 11 to permit the same to assume an angular position with respect to the side walls of the cross bar 10 as will be understood to be desired.

Located near the upper end of the leg 11 so as to be in substantial alignment with the hole 18 when the leg 11 is assembled in the slots 16 is a hole 15. As shown in Figures 2–4 the holes 15 and 18 are adapted to receive an elongated bolt 20, the threaded end of which extends into the cross bar 10 and is retained therein by means of washer 21, coil spring 22, washer 23, nut 24 and cotter pin 25 assembled in the order stated as shown in Figure 3. The arrangement here is such that the legs 11 and cross bar 10 are drawn together by a relatively strong but resilient force exerted by the springs 22.

As may be observed in Figure 3 the legs 11, when in the supporting position, are retained against rotational or side movement with respect to the cross bar 10 by means of the slots 16 which engage the side walls 17 of the said legs. Positive support of the cross bar 10 is provided by means of the slots 19 which engage the vertical walls of the cross bar in the manner described; the force of the spring 23 and friction of the legs 11 in contact with the ground or other supporting surface being relied upon to prevent the legs from spreading outwardly to permit the cross bar 10 to be lowered. It will be understood that for the uses contemplated only negligible weight will be supported by the legs 11 and thus additional means for preventing the legs 11 from spreading outwardly is unnecessary. If desired, however, such means could be easily furnished by a skilled mechanic.

To facilitate collapsing the assembly described above as according to the objects of this invention I provide a relatively thin strip of metal 26 which extends across the outer edges of the channeled legs 11 and in the embodiments shown is secured thereto along the side walls 17. As shown in Figures 3 and 4 the strip is positioned below the hole 15 in such manner as to be in contact with or in near proximity to the side wall of the cross bar 10. Thus it will be apparent that upon sliding the legs 11 vertically downward, holes 15 and 18 being somewhat oversize to provide sufficient freedom of movement for this purpose, the notches 19 may be disengaged. After disengaging the notches 19 the lower ends of the legs 11 may be pressed inwardly, pivoting about the strip 26; the result being that when the leg 11 is moved into the position shown in Figure 4 the side walls 17 are entirely withdrawn from the slots 16. The leg may then be rotated about the axis of the bolt 20 and folded upwardly to the position shown in Figure 5.

In order to maintain the folded legs in flat relation with respect to the cross bar 10 I have provided lugs 27 which are secured to the side walls 17 of the legs above the holes 15 therein, and which extend outwardly of the side walls a distance substantially equal to the thickness of the strip 26. The arrangement, as best shown in Figure 4, provides that the legs 11, when folded, will be supported on one side of the bolt 20 by the strip 26 and on the other side by means of the lugs 27.

A convenient method of shipping or storing my apparatus where conservation of space and ease of handling is an important consideration is shown in Figure 6. For For this purpose I have provided removable end caps 28 which are detachably secured to the ends of the cross bar 10 by any suitable means such as screws 29. In the illustrated embodiments of the invention the internal dimensions of the cross bar 10 are such that the legs 11, after having been completely detached, may be placed therein along with the associated bolts, etc. The end cap or caps 28 are then replaced and secured to completely enclose the various components and thus prevent subsequent accidental loss thereof.

In the modified embodiment of the invention shown in Figures 7–10 I have included a novel combination of elements whereby various articles of display as, for example, warning lanterns may be secured to the road blocking apparatus above described in such manner as to materially reduce the probability of theft of such lanterns or articles of display.

In Figures 8 and 9 I have shown a modified form of connecting bolt 20′ having welded or otherwise secured to its threaded end an eccentric arm 30. In the proposed form of the invention I have utilized modified connecting bolts 20′ to connect one leg 11 at each end of the cross bar 10′. Preferably, though not necessarily, the modified connections are located on the same side of the cross bar 10′. Secured to the outer or head end of each bolt 20′ is a dog 29, the outer end of which is directed inwardly toward the leg 11 and through an aperture 37 formed therein. This arrangement provides that any rotation of the leg 11 about the axis of the bolt 20′ will be transmitted to the bolt; it being understood, of course, that any other suitable means for accomplishing this is contemplated as being within the scope of the invention.

Suspended by the offset portions of the eccentric arms 30, by means of elongated slots 31 through which the said arms 30 extend and along which they are free to slide, is a supporting bar 32. As will be noted, each of the eccentric arms 30 is so disposed that the offset portion thereof is in its lowermost position when the leg 11 associated therewith is folded along the side of the cross bar 10′. As the leg 11 is moved to the downwardly directed supporting position the bolt 20′ and consequently the eccentric arm 30 is rotated through an arc of 90 degrees, thus substantially raising the position of the offset portion and likewise the end of the supporting arms suspended thereby.

Secured to and depending downwardly from the supporting bar 32 at points near each end thereof are hook members 33 to which various articles of display may be secured. Positioned directly below each of the hook members 33, in the bottom wall of the cross bar 10′, I have provided elongated slots 34. As will be observed the slots 34 are somewhat wider than the hooks 33 and extend longitudinally a substantial distance on each side thereof. The dimensions of the various associated components are such that when the legs 11 are in the folded position hooks 33 will extend into or through the slots 34 whereby a bail 35 of a warning lantern or other device may be easily secured thereto. With the bails 35 thus secured, legs 11 may be rotated into the normal supporting position, whereupon the said bails will be drawn upwardly into the cross bar 10′. Preferably the length of the slots 34 is such that the bails 35, when so drawn upwardly, will be pulled tightly against the ends of the slots to thereby prevent accidental or unauthorized intentional removal of the lantern.

In the specific embodiment herein shown I have located the hooks 33 in near proximity to the eccentric arms 30 so that but one of the legs 11 need be folded to remove a lantern from the hook adjacent thereto. This, however, is merely a matter of choice and various other arrangements will be considered as being within the scope of the principles disclosed.

It should now be apparent that I have accomplished the objects initially set forth. I have provided a collapsible structure, as illustrated in the form of a road blocking device, embodying certain new and useful improvements whereby the apparatus is light in weight but of ample strength, and is particularly suited for transportation from job to job as is generally necessary in such construction and repair work. By the principles of my invention as hereinbefore disclosed I have provided a device of the character described which, when assembled and unfolded for use, forms a rigid structure fully capable of withstanding the rough and negligent usage to which such apparatus is often subjected, but which may be readily collapsed into a small unit of optimum shape and size for subsequent transportation and handling.

In addition to the above advantageous features and characteristics, the apparatus according to the present invention is of utter simplicity of construction and may be economically fabricated from standard materials and components. It may well be understood that various well known techniques of mass production may be employed to render this apparatus available at very low cost.

As is clearly illustrated in Figures 7–10 of the drawing and in the portion of the specification associated therewith, the standard form of the invention may be readily modified by combining therewith certain other novel elements whereby warning lanterns and the like may be readily secured to the apparatus in such manner as to render it difficult for unautharized persons not having knowledge of the construction of the apparatus to remove the lanterns.

It should be understood that the above specifically described embodiments are intended to be illustrative only since numerous alterations may be made therein without departing from the spirit of the invention. Reference should therefore be had to the appended claims in determining the true scope of the invention.

I claim:

1. Apparatus of the character described comprising in combination a tubular cross bar having a substantially rectangular cross section, said cross bar having pairs of spaced vertical slots in its vertical walls near each longitudinal end thereof and holes located substantially centrally with respect to ach of said pairs of slots, said slots terminating at their lower ends above the bottom edge of said bars, channel shaped leg members for supporting said cross bar, each of said leg members having side walls upper end portions of which are partially received in said slots and a hole located in substantial axial alignment with one of the holes of said cross bar, and connecting assemblies each comprising a bolt and nut and a compressible coil spring retained on said bolt, said bolts being retained in the holes of said legs and said cross bar whereby said legs and said cross bar are retained in resilient contact, the arrangement being such that said legs may be pivoted inwardly about axes adjacent the lower edge of said slots whereby said side walls are withdrawn from said slots to permit said leg to be rotated about said bolts and into longitudinal alignment with said cross bar.

2. Apparatus according to claim 1 further characterized by transverse strips secured to said side walls of each leg and extending across the edges thereof adjacent said cross bar, said strips being normally in contact with or in near proximity to the vertical wall of said cross bar when said side walls are received in said slots whereby upon said legs being pivoted inwardly about said axes said strips serve as fulcrums to facilitate withdrawal of said side walls from said slots.

3. Apparatus according to claim 1 further characterized by said upper end portions being notched to engage a portion of said vertical walls above said slots whereby said legs are prevented from being pivoted inwardly about said axes.

4. Apparatus of the character described comprising in combination a cross bar member of tubular construction and having a longitudinal slot of predetermined length in the bottom portion thereof, said cross bar member having spaced pairs of vertical slots at each side of both longitudinal end portions thereof, channel shaped leg members for supporting said cross bar member, each of said leg members having side walls the upper end portions of which are partially received in said slots, pivotal connecting means to resiliently secure said legs to said cross bar whereby said side walls may be withdrawn from said slots and said legs may thereafter be pivoted into longitudinal alignment with said cross bar, said pivotal connecting means for at least one leg member at each end of said cross bar comprising a bolt member extending through a leg and said cross bar, an eccentric arm secured to said bolt member within said cross bar, means associated with said bolt member and said leg whereby pivotal movement of said leg about the axis of said bolt member is transmitted to said bolt member, a rigid supporting bar positioned within said tubular cross bar member and connecting an eccentric arm at ach end, and article-engaging hook means secured to said supporting bar and extending downwardly therefrom toward said longitudinal slot, the arrangement being such that when one or both of said legs is in a folded position said hook means is in close proximity to said longitudinal slot and when said legs are in the supporting position said hook means is substantially retracted from said longitudinal slot.

5. Apparatus of the character described comprising in combination a cross bar member of tubular construction and having a longitudinal slot of predetermined length in the bottom portion thereof, said cross bar member having spaced pairs of vertical slots at each side of both longitudinal end portions thereof, channel shaped leg members for supporting said cross bar member, each of said leg members having side walls the upper end portions of which are partially received in said slots, pivotal connecting means to resiliently secure said legs to said cross bar whereby said side walls may be withdrawn from said slots and said legs may thereafter be pivoted into longitudinal alignment with said cross bar, said pivotal connecting means for at least one of said legs including an eccentric arm and means associated with said arm and said leg for transmitting rotary motion of said leg to said arm, and article-engaging hook means positioned interiorly of said cross bar and extending toward said slot, said hook means being associated with said arm whereby said hook means is in close proximity to said slot when said leg is in folded position and withdrawn from said slot when said leg is in supporting position.

References Cited in the file of this patent

UNITED STATES PATENTS

| | | |
|---|---|---|
| 210,156 | Schultes et al. | Nov. 19, 1878 |
| 1,355,213 | Chipperfield | Oct. 12, 1920 |
| 1,885,384 | Snow | Nov. 1, 1932 |
| 1,961,760 | Hamren | June 5, 1934 |
| 2,001,438 | Stuck | May 14, 1935 |
| 2,144,049 | Forcier | Jan. 17, 1939 |
| 2,177,431 | Griffiths | Oct. 24, 1939 |